United States Patent
Epstein et al.

(10) Patent No.: US 7,228,317 B1
(45) Date of Patent: Jun. 5, 2007

(54) METHOD AND APPARATUS FOR ACCELERATING AND IMPROVING ACCESS TO NETWORK FILES

(75) Inventors: Kevin A. Epstein, San Mateo, CA (US); Bradley G. Fowlow, San Jose, CA (US); Michael A. Chowla, San Carlos, CA (US); Marco Zagha, Belmont, CA (US)

(73) Assignee: YAHOO! Inc., Sunnyvale, CA (US)

( * ) Notice: Subject to any disclaimer, the term of this patent is extended or adjusted under 35 U.S.C. 154(b) by 814 days.

(21) Appl. No.: 10/174,735

(22) Filed: Jun. 18, 2002

(51) Int. Cl.
*G06F 17/30* (2006.01)
(52) U.S. Cl. .................................................. 707/203
(58) Field of Classification Search ................... 707/10, 707/104.1, 103 R, 201, 202, 203, 204; 709/219, 709/227, 224
See application file for complete search history.

(56) References Cited

U.S. PATENT DOCUMENTS 6,021,426 A 2/2000 Douglis et al. ............. 709/200
2001/0042124 A1* 11/2001 Barron ....................... 709/227
2002/0029227 A1* 3/2002 Multer et al. ............... 707/203
2002/0161860 A1* 10/2002 Godlin et al. ............... 709/219
2003/0220944 A1* 11/2003 Lyman ....................... 707/203

OTHER PUBLICATIONS

Joshua P. MacDonald, File System Support for Delta Compression, Aug. 29, 2000, pp. 1-32.*

* cited by examiner

*Primary Examiner*—Etienne P LeRoux
(74) *Attorney, Agent, or Firm*—Hickman Palermo Truong & Becker LLP

(57) ABSTRACT

A method and apparatus for accelerating and improving access to network files is provided. One technique for providing data quickly and efficiently is to send a thumbnail of a file to a user rather than sending the entire file. Another technique for providing data quickly and efficiently is to generate the difference between a current version of data and a non-current version of data, to transmit this difference to the requesting user, and to use the difference to update the non-current version of data the user currently has access to. A third technique that can be used in combination with the first two techniques is to compress data, such as the thumbnail or file difference, before transmitting this data. A fourth technique that can be used in combination with the third technique is to securely transmit the compressed data.

23 Claims, 5 Drawing Sheets

METHOD AND APPARATUS FOR ACCELERATING AND IMPROVING ACCESS TO NETWORK FILES

FIELD OF THE INVENTION

The present invention relates to accessing network files and more specifically to accelerating and improving access to network files.

BACKGROUND OF THE INVENTION

In the early days of computing, a computer only had access to data that was on that computer's local disk. As time progressed, computers were connected together using networks. Thus, there was a possibility that each computer could access data on other computer's local disks (hereinafter referred to as "decentralized file systems"). FIG. 1 is a block diagram of a decentralized file system with three computers (110, 120, and 130). Each of these three computers is associated with a corresponding local disk (111, 121, 131). Using a decentralized file system mechanism, computer 110 can access data on disk 131, which is associated with computer 130.

However, the problem with decentralized file systems is that managing the data is difficult because the data is spread out. Furthermore, decentralized file systems make file sharing difficult. For example, a department may have files that each person in the department needs to update on a regular basis. If these files are spread among various computer systems, all of those various systems must constantly remain online for the files to be available. Furthermore, because of the critical nature of these files, these files need to be backed up on a regular basis. Backing up files that are spread across many systems can by a complex, and time and resource-consuming, operation. A decentralized file system is not convenient for file sharing or managing files.

The next step in the evolution of file systems was to centralize important data onto one or more centralized shared disks (hereinafter referred to as a "centralized file system"). FIG. 2 is a block diagram of a centralized file system. The shared files reside on the shared disk 240. The computers (210, 220, and 230) have access to the files on shared disk 240. This is a more convenient topology for sharing files among many people and for managing files, for example, by backing up the files. However, there are also problems with centralized file systems. For example, if the bandwidth of the connection 250 between the shared disk 240 and the computer 210 is low, then computer 210 will have slow access to the files on shared disk 240. Worse yet, if connection 250 is down, computer 210 will not be able to access files on shared disk 240 at all.

A third approach to file sharing is where not only do computers share data using shared disks but also the data on the shared disks is replicated. The replicated data is "pushed" to local disks associated with the individual computers (hereinafter referred to as a "hybrid file system"). FIG. 3 is a block diagram of a hybrid file system. The computers (310, 320, 330, 350, and 360) share files that are on the shared disks (341 and 342), but do so by accessing the replicated versions of those files on their local disks (311, 321, 331, 351, and 361).

To address potential problems with speed of access and connections going down, the data on the shared disks (341 and 342) is periodically replicated and this replicated data is pushed to the individual computers (310, 320, 330, 350, and 360) that are interested in the replicated data. Then the replicated data is stored on the local disks (311, 321, 331, 351, and 361). Policies are used to determine which computers are interested in what shared files and at what intervals the shared files of interest are to be transmitted to the interested computers. For example, assume there is a slide-presentation file on shared disk 341 that computer 350 is interested in. A policy is set up indicating that this slide-presentation file on shared disk 341 is replicated every 24 hours and sent to computer 350 where the slide-presentation file is then stored on the local disk 351.

Such a hybrid file system addresses the problem of access speed because computer 350 accesses the local version. However, other problems are associated with hybrid file systems. For example, the slide-presentation file on shared disk 341 may be transmitted to computer 350 at 2:00 AM and stored locally on disk 351. Then, at 2:05 AM on the same day, someone modifies the slide-presentation file on shared disk 341. The person using computer 350 will be using an old version of the slide-presentation file until the next time the slide-presentation file is transmitted to computer 350. Furthermore, a hybrid file system is not an efficient use of resources such as CPU cycles or storage space. Additional CPU cycles are needed to replicate data and transmit the replicated data to the interested parties. Additional storage space is needed to store the various versions of replicated data on all the computers that are interested in this replicated data. The problem of connections having low bandwidth or going down still exists. Policies for replicating the shared data are also needed, increasing the complexity of setup and maintenance.

Based on the foregoing, it is clearly desirable to provide techniques and mechanisms for sharing data that avoids problems associated with current approaches.

SUMMARY OF THE INVENTION

Techniques are provided for accelerating and improving access to network files. One technique for providing data quickly and efficiently is to send a thumbnail of a file to a user rather than sending the entire file. The thumbnail has enough information to convey the contents of the full version of the file, but contains less data. According to one embodiment, the thumbnail version is accompanied by address data that allows the full version of the file to be easily retrieved if, after inspecting the thumbnail, a user determines that the full version is needed.

Another technique for providing data quickly and efficiently is to generate, at a "parent" component that is remote relative to the requestor, the difference between a current version of data and a non-current version of data. The parent component then transmits this difference to a "child" component that is located closer to the requestor. The child component uses the difference to update the non-current version of data the requesting user currently has access to, and to provide the current version thus created to the requestor.

A third technique that can be used in combination with the first two techniques is to use the parent component to compress data (either the entire file, the thumbnail or file difference) before transmitting the data to the child component. The child component decompresses the data prior to providing the data to the requestor. A fourth technique that can be used in combination with the third technique is to securely transmit the compressed data between the parent and child component.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
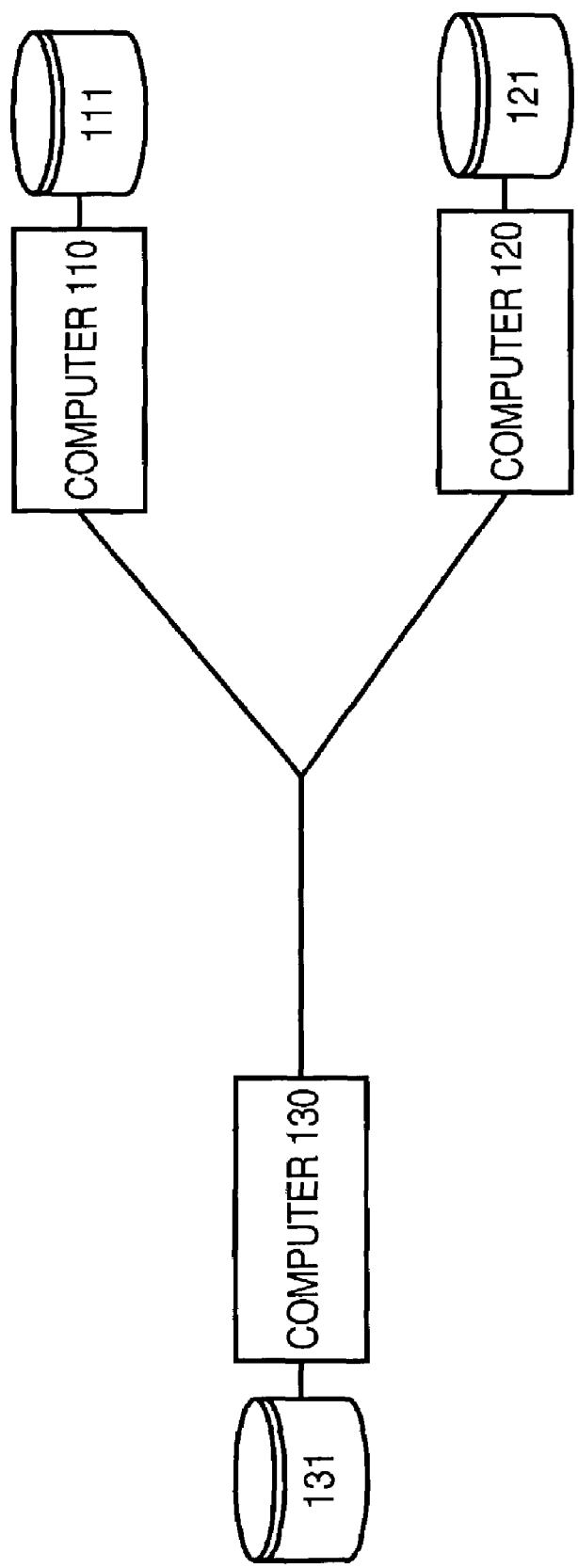
FIG. 1 is a block diagram of a decentralized file system.
Figure 2:
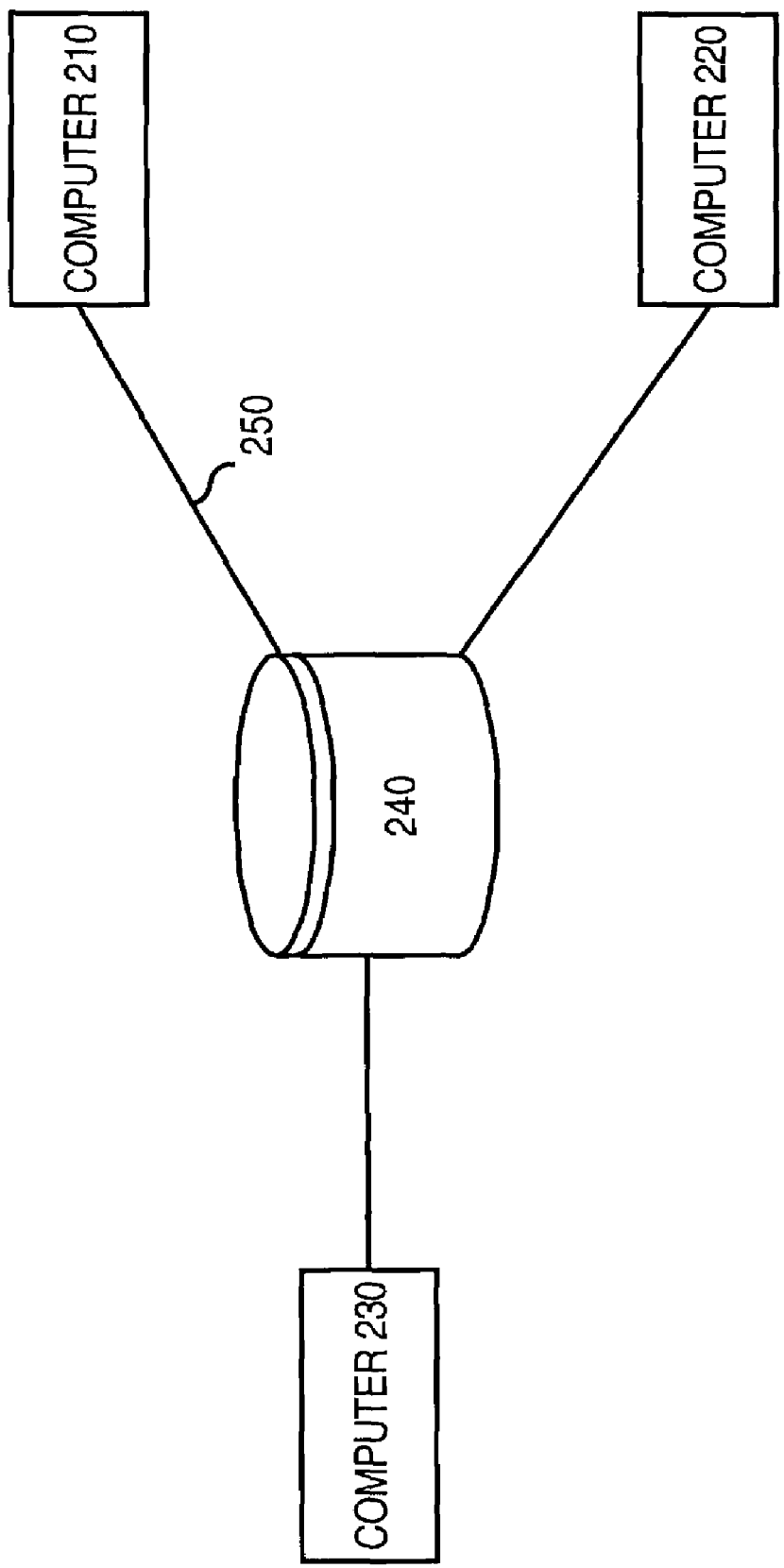
FIG. 2 is a block diagram of a centralized file system.
Figure 3:
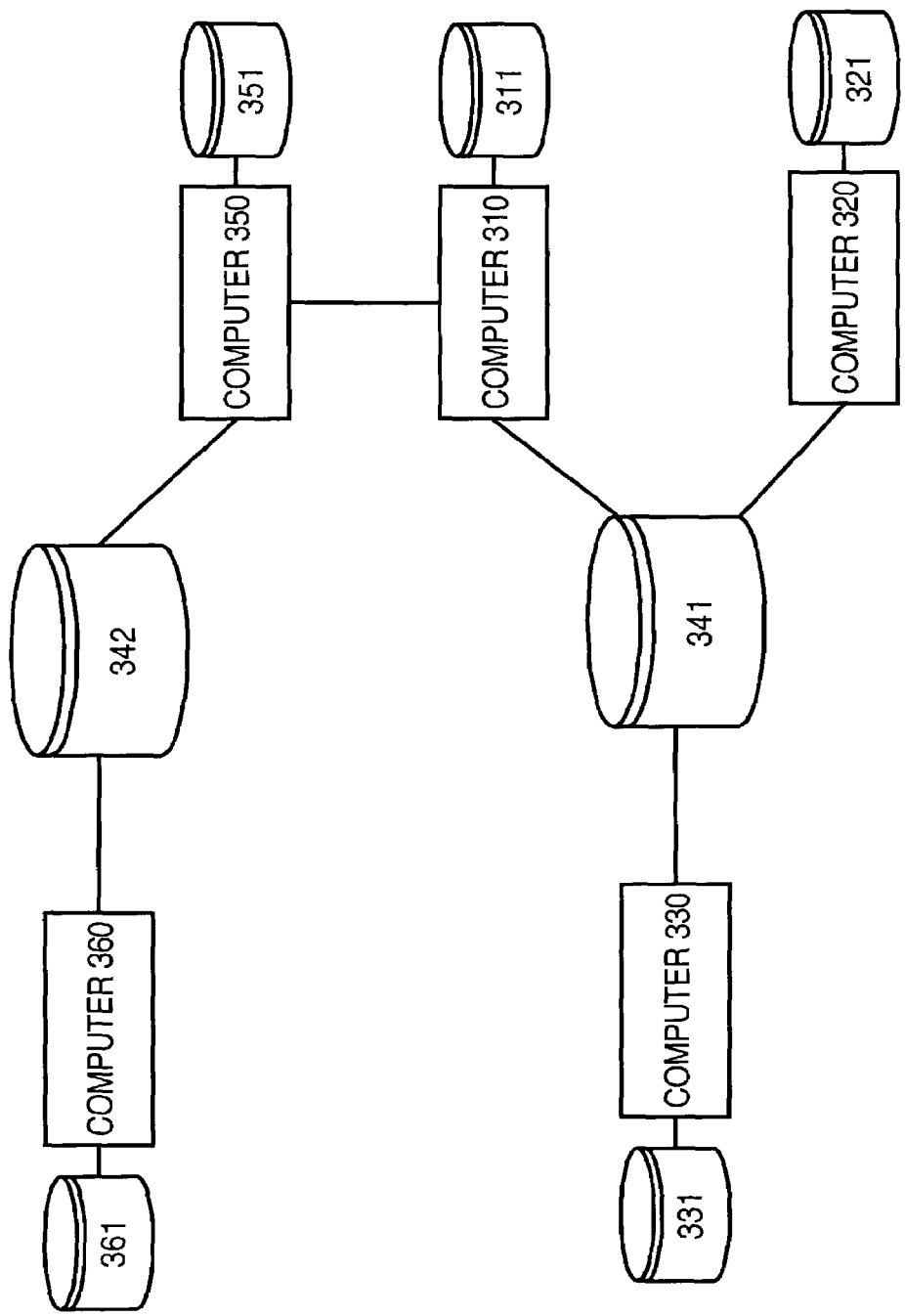
FIG. 3 is a block diagram of a hybrid file system.

A method and apparatus for accelerating and improving access to network files is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

TECHNICAL OVERVIEW

Given that much of the data that people are interested in resides on remote devices, techniques are needed to access this data quickly, securely, and efficiently. One technique for providing data quickly and efficiently is to send a thumbnail of a file to a user rather than sending the entire file. For example, if the user on computer 350 requests a large slide-presentation file on shared disk 341, instead of sending the entire slide-presentation file, which could take 10 to 15 minutes, a second file that is smaller than the slide-presentation file and contains content of the slide-presentation file (hereinafter referred to as a "thumbnail") is sent to the user on computer 350. When the user looks at the thumbnail, the user can determine based on the information in the thumbnail whether the user is interested in retrieving the entire slide-presentation file. This technique provides quicker data transmission because a thumbnail of the slide-presentation file is smaller than the entire slide-presentation file. Furthermore, the user is provided with an opportunity to determine whether the user is interested in the slide-presentation file. This technique is efficient in that CPU cycles and storage space are saved in the event that the user is not interested in the slide-presentation file.

Another technique for providing data quickly and efficiently involves the use of a "parent component" and a "child component". The parent component resides near a source of files. The child component resides near a requestor. The requestor interacts with the child component as if the child component actually stored the files. The child component provides the files to the child by, transparent to the requestor, interacting with the parent component.

Specifically, according to one technique, the parent and child components are used to: (1) generate at the parent component the difference (hereinafter referred to as a "delta") between a current version of data and a non-current version of data that resides on or near the child component, (2) transmit this delta from the parent component to the child component, and (3) use the delta and the non-current version of data at the child component to construct the current version of the data. Furthermore, this technique provides quicker transmission of data because the delta that is transmitted between the parent component and the child component is typically significantly smaller than the whole file.

A third technique, which can be used in combination with the first two techniques, is to compress data, such as a thumbnail or a delta, before transmitting this data to the child component. Then, when the compressed data arrives at the child component, the data is decompressed. The decompressed version is provided to the requestor. This technique provides quicker data transmission because compressed data is smaller than the decompressed version of the same data.

The communication between the parent component and the child component may involve the "least secure" segment of the communication path between the source and the requestor. For example, the parent component may communicate with the source through a secure private network, and the child component may communicate with the requestor through a secure private network. However, the parent component may communicate with the child component through a large public network, such as the Internet. Therefore, a fourth technique that can be used in combination with any of the preceding techniques is to securely transmit the data between the parent component and the child component. As a result, the portion of the communication path that is most vulnerable to attack is rendered secure without requiring either the source or the requestor to be modified to handle the complexities associated with secure communications.

EXAMPLE SYSTEM

Figure 4:
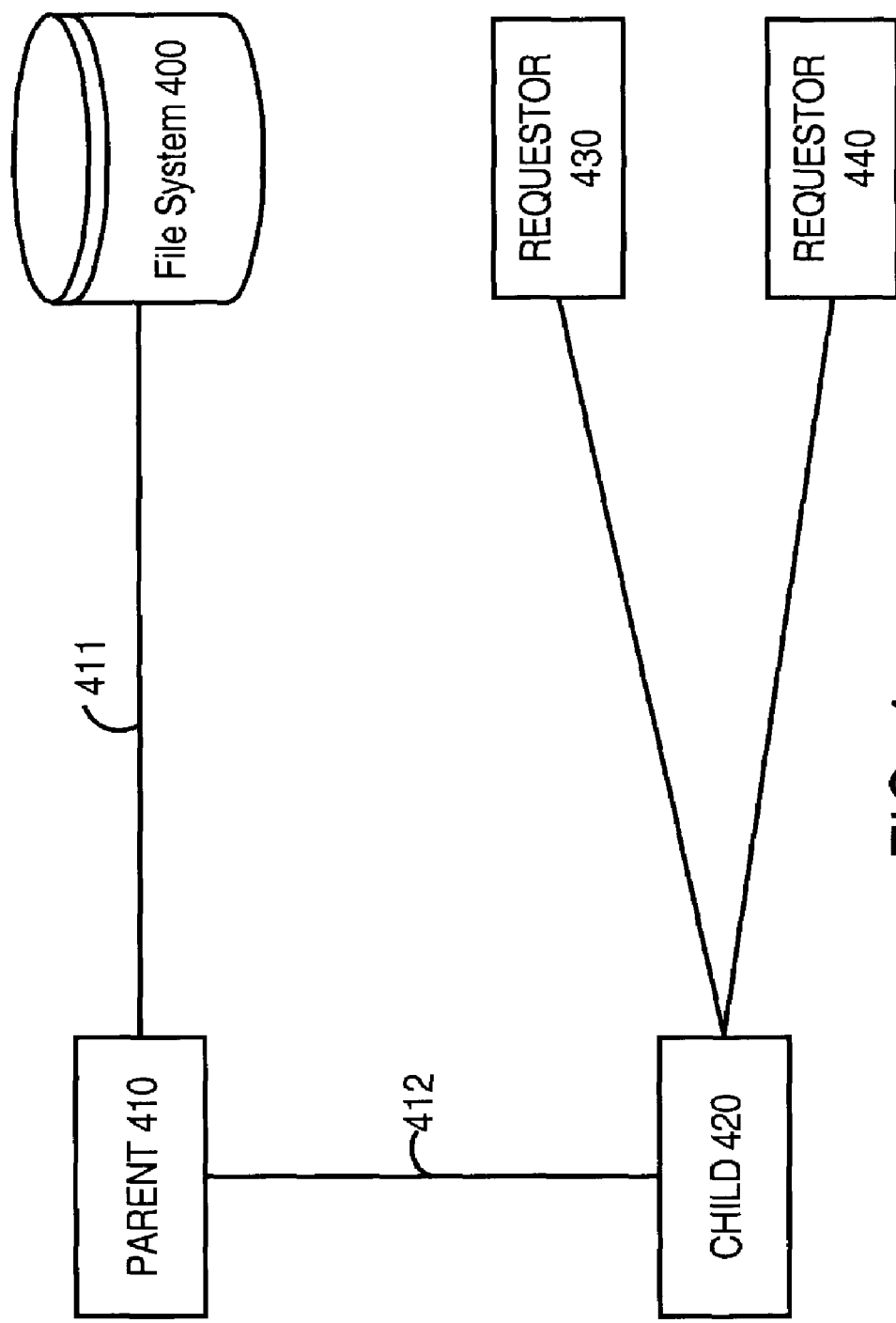
FIG. 4 is a block diagram of system that implements an embodiment of the invention.

FIG. 4 is a block diagram of a system where the above four techniques are used. To continue the example, the slide-presentation file resides on a file source 400. The file source 400 could be any device capable of storing data. Examples of such devices include but are not limited to a disk, a database, and a file system. The parent component 410 is a gateway that understands various features associated with the slide-presentation file, such as the permissions for accessing the slide-presentation file and the "cacheability" of the slide-presentation file. The cacheability of a file generally refers to the rules that govern the conditions under which the file is allowed to be cached. For example, some files may be designated as "uncacheable". Other files may be cacheable for up to a particular amount of time, at which point the cached version "expires".

According to one embodiment, the parent component 410 understands many different protocols and translates those protocols into HTTP. Therefore, many different protocols may be used over connection 411, whereas HTTP is used for connection 412. Examples of the different protocols that may be used on connection 411 include but are not limited to storage area network protocols, Network File Server (NFS), fiber channel protocol, SCSI protocol, and Common Internet File System (CIFS).

Child component 420 is any mechanism that is capable of storing (1) the slide-presentation file, (2) part of the slide-presentation file, or (3) information associated with the slide-presentation file. Examples of information associated with the slide-presentation file include but are not limited to (1) a thumbnail of the file, (2) cacheability of the file, (3) access permissions, (4) size of the file, and (5) name of the file. The child component 420 could be, among other things: a cache, a micro Traffic Server® cache in the user's lab top behind the user's browser, a cache in a cable modem, or a cache in a set top box. There is no requirement for the child component 420 to be a cache. The requestor 430 represents the computer used by a user who is interested in the slide-presentation file on file source 400. Although this example refers to a slide-presentation file, the file in question could be any kind of file or data.

Parent as Web Server

A web server can be used as a parent component 410. Since web servers are capable of indexing files, parent component 410 is used to index the files on the file source 400. Then requestor 430 is provided with a directory listing of the indexed files on the file source. For example, assume that file source 400 has files foo1, foo2, and foo3. Requestor 430 requests to see the directory listing for the files on file source 400. Parent component 410 indexes the files foo1, foo2, and foo3 and provides a directory listing of these indexed files to requestor 430. A user on requestor 430 requests a particular file, foo1, by clicking on an icon associated with foo1 in the directory list.

Operation of the Parent Component

Assume that a user requests a particular file, such as foo1. According to one embodiment, parent component 410 inspects the size of foo1 before sending it. If the size of foo1 exceeds a particular threshold, then parent component 410 does not send foo1. Instead, requestor 430 is provided with a thumbnail of foo1.

According to another technique, upon receiving a request, parent component 410 determines if foo1 has been modified since foo1 was last provided to child component 420. If foo1 has been modified since last provided to child component 420, parent component 410 generates a delta between the current version of foo1 on file source 400 and the version of foo1 last provided to child component 420. Parent component 410 transmits this delta to child component 420. Then child component 420 uses the delta to update foo1 and transmits the updated foo1 to requestor 430.

Child component 420 can cache foo1, thereby increasing speed of access and decreasing CPU cycles in providing foo1 to requestor 430. In an embodiment in which child component 420 caches foo1, child component 420 may respond to a request for foo1 by (1) determining the version of foo1 contained in the cache, (2) sending a request for foo1 to parent component 410 along with information indicating the version of foo1 contained in the cache. Parent component 410 determines that the version in the cache is the current version, then parent component 410 simply tells child component 420 to provide the cached version. On the other hand, if parent component 410 determines that the cached version is not current, then parent component 410 sends a delta to child component 420. Child component 420 uses the delta and the cached version to construct a copy of the current version. The current version thus created is provided to the requestor.

User Requests a Web Page

A user on requestor 430 clicks on a link for a particular web page, which is a type of file. The requested page is on file source 400. The requestor 430 requests the web page using a browser on requestor 430. The request for the web page goes to child component 420. Assume that child component 420 already has the web page. Child component 420 may already have the particular web page under a variety of circumstances. For example, child component 420 may already have the web page because requestor 430 or some other requestor previously requested the web page, or because the parent component 410 monitors the web site that contains the web page, and "pushes" the web page (or a delta thereof) to child component 420 whenever the web page is modified.

If the child component 420 has a copy of the web page, the child component 420 determines whether the copy can be supplied to the requestor 430. The operation of determining whether the copy can be supplied to the requestor 430 may involve, for example, sending version information to the parent component 410, and receiving from the parent component a response that indicates whether the version contained in child component 420 is current. On the other hand, child component 420 may determine that the version is current because an expiration time associated with the version has not yet been reached. If the version currently stored at child component 420 can be supplied to requestor 430, then that version is supplied to requestor 430 without requiring the web page be supplied again from source 400.

If it is determined that the version of the web page that is stored on the child component 420 cannot be supplied to the requestor 430, then parent component 410 uses the version information from the child component 420 to determine a delta between the new version and the version currently at the child component. The parent component 410 sends the delta to the child component 420, and the child component 420 constructs the current version of the web page based on the delta and the version that is already at the child component 420.

Pushing Deltas to the Client Component

Assume that a slide-presentation file on file source 400 is modified. According to one embodiment, at some predetermined interval, parent component 410 monitors the file source 400 for modified files. During one such monitoring operation, parent component 410 determines that the slide-presentation file has been modified. Parent component 410 generates a delta of the slide-presentation file and transmits this delta to child component 420. The delta thus provided to the child component 420 is said to be "pushed" to the child component 420 because the sending of the delta is not performed in response to any request from the child component 420.

Child component 420 updates a local copy of the slide-presentation file using the delta. Sometime later, a user on requestor 430 requests to see the same slide-presentation file. When this request for the slide-presentation file arrives at child component 420, child component 420 transmits the updated slide-presentation file to requestor 430.

Compression

Any data that is transmitted between the parent component 410 and requestor 430 can be compressed. Examples of this data include but are not limited to (1) a file, (2) part of a file such as a delta, or (3) information associated with the file. Examples of information associated with the file include but are not limited to (1) a thumbnail of the file, (2) cacheability of the file, (3) access permissions to the file, (4) size of the file, and (5) name of the file.

For example, before parent component 410 transmits a delta to child component 420, parent component 410 compresses the delta. Child component 420 decompresses the delta and uses the delta to update a local non-current version of the same file. The current version of the file, thus constructed, is sent to the requestor. Because the decompression of the file is performed by the child component 420, the data transmission operation is performed more efficiently without requiring the requestor 430 itself to handle the complexities of decompression.

Security

Parent component 410 and child component 420 may be used to transmit data securely in a manner that is transparent to the requestor. For example, parent component 410 compresses a requested file, then transmits the file securely to child component 420. HTTP SSL is one of many mechanisms that may be used to transmit the data securely.

When the file arrives at child component 420, the file is received securely and decompressed. Child component 420 may then provide the file to requestor 430. Thus, requestor 430 may receive a file that has been transmitted securely without having to have any knowledge of or logic to implement the mechanism used in the secure transmission.

Variations

Although the examples herein described a user on a requestor computer (such as 430 and 440) requesting a file, the requestor computer could instead be an intermediary computer in a string of computers. Furthermore, instead of a user's actions causing a thumbnail or delta to be generated and transmitted, an automated program running on a requesting computer could cause the thumbnail or delta to be generated and transmitted.

Hardware Overview

Figure 5:
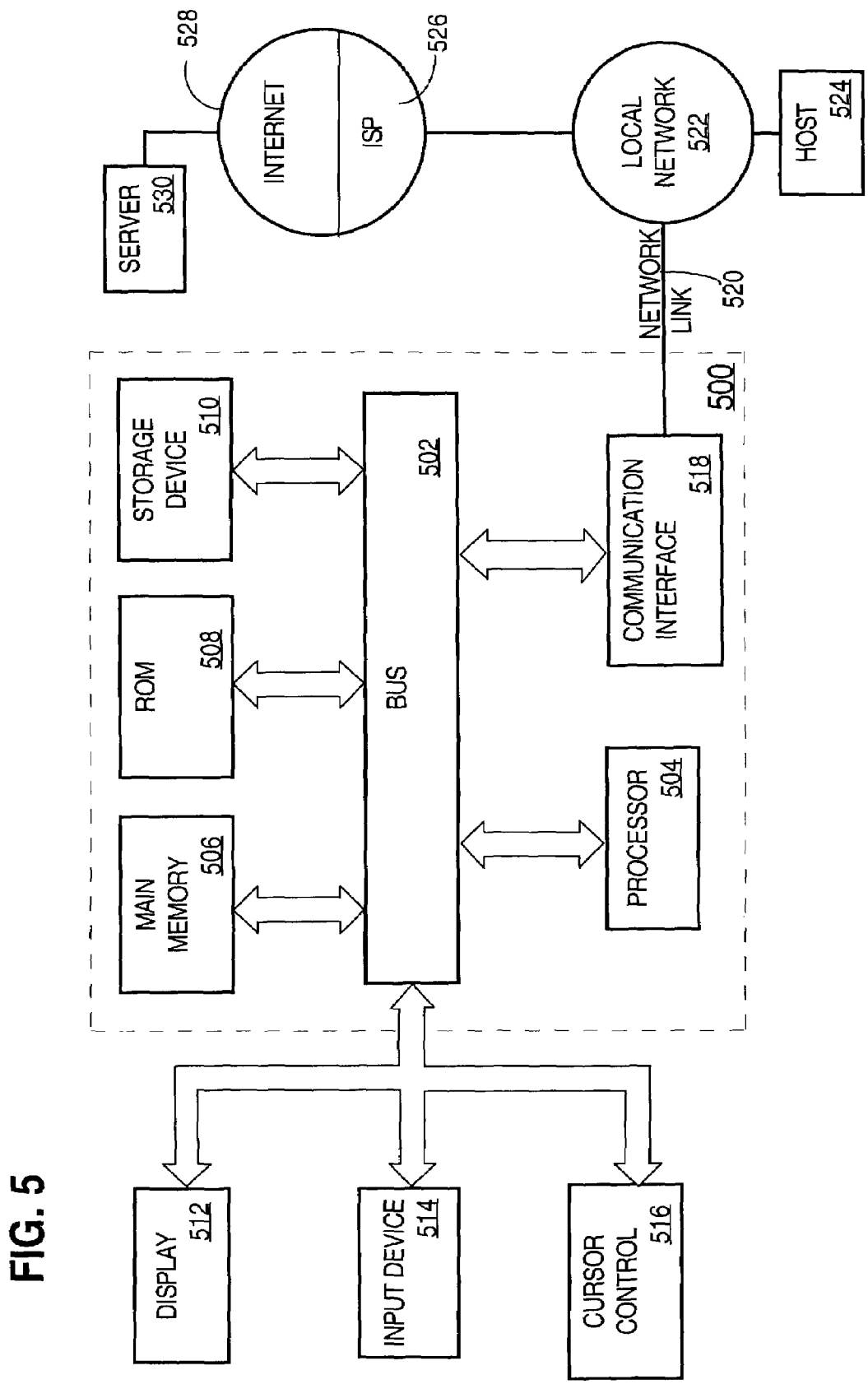
FIG. 5 is a block diagram of a computer system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for accelerating and improving access to network files,
comprising the computer-implemented steps of:
maintaining, within a child component, a cache of files obtained by said child component, from a file source, in response to previously-received requests from requestors;
in response to a request from a requestor, retrieving a current version of a file from said file source;
determining if said file has been modified since said file was provided to said child component by comparing said current version of said file with a version of said file that was sent to said child component;
if said file has been modified since last provided to said child component, then
generating a delta of said file wherein said delta indicates differences between said current version and said version that was sent to said child component;
transmitting said delta to said child component;
using said delta and said version on said child component to create an updated version of said file on said child component;
transmitting said updated version to said requestor; and
in response to detecting that a second file has been changed at said file source, performing the steps of:
determining that a non-current version of said second file resides in said cache of files maintained within said child component; and
in response to determining that said non-current version of said second file resides in said cache of files maintained within said child component, causing said non-current version of said second file to be updated within said child component without having received any request for said second file from said child component, by performing the steps of:
generating a second delta of said second file wherein said second delta indicates differences between said non-current version of said second file on said child component and said second file at said file source;
transmitting said second delta to said child component; and
using said second delta and said non-current version on said child component to create a second updated version of said second file on said child component.

2. The method of claim 1, wherein said delta is compressed and the step of generating said delta further includes compressing said delta.

3. The method of claim 2, wherein said delta is transmitted securely and the step of transmitting said delta further includes transmitting said delta to said child component securely.

4. The method of claim 3, wherein said delta is transmitted securely with the HTTP SSL protocol.

5. The method of claim 1, wherein said request is received at a parent component and the steps of retrieving said current version and determining if said file has been modified are performed by said parent component.

6. The method of claim 5, wherein said parent component is on a web server.

7. The method of claim 5, wherein said parent component is configured to communicate with said child component and said child component is configured to communicate with said parent component.

8. The method of claim 1, said file is requested by selecting an item in a directory listing wherein said item corresponds to said file.

9. The method of claim 8, wherein a parent component generates said directory listing.

10. The method of claim 1, further comprising the computer-implemented step of caching said updated version on said child component.

11. The method of claim 1, wherein the step of retrieving said current version of said file from said file source further includes the step of checking permissions associated with said file to determine if said requestor is permitted to request said current version.

12. A system for accelerating and improving access to network files comprising:
a file source wherein current versions of files are stored;
a parent component; and
a child component;
wherein said parent component is configured to perform the computer-implemented steps of:
maintaining, within said child component, a cache of files obtained by said child component, from said file source, in response to previously-received requests from requestors;
retrieving said current version of said file from said file source;
determining if said file has been modified since said file was provided to said child component by comparing said current version of said file with a version of said file that was sent to said child component;
if said file has been modified since last provided to said child component, then
generating a delta of said file wherein said delta indicates differences between said current version and said version that was sent to said child component;
transmitting said delta to said child component;
in response to detecting that a second file has been changed at said file source, performing the steps of:
determining that a non-current version of said second file resides in said cache of files maintained within said child component; and
in response to determining that said non-current version of said second file resides in said cache of files maintained within said child component, causing said non-current version of said second file to be updated within said child component without having received any request for said second file from said child component, by performing the steps of:
  generating a second delta of said second file wherein said second delta indicates differences between said non-current version of said second file on said child component and said second file at said file source;
  transmitting said second delta to said child component; and
  using said second delta and said non-current version on said child component to create a second updated version of said second file on said child component;
said child component being configured to perform the computer-implemented steps of:
  using said delta and said version that was sent to said child component to create an updated version of said file; and
  providing said updated version to said requestor.

13. A computer-readable medium carrying one or more sequences of instructions for accelerating and improving access to network files, wherein execution of the one or more sequences of instructions by one or more processors causes the one or more processors to perform the steps of:
  maintaining, within a child component, a cache of files obtained by said child component, from a file source, in response to previously-received requests from requestors;
  in response to a request from a requestor, retrieving a current version of a file from said file source;
  determining if said file has been modified since said file was provided to said child component by comparing said current version of said file with a version of said file that was sent to said child component;
  if said file has been modified since last provided to said child component, then
    generating a delta of said file wherein said delta indicates differences between said current version and said version that was sent to said child component;
    transmitting said delta to said child component;
    using said delta and said version on said child component to create an updated version of said file on said child component;
    transmitting said updated version to said requestor; and
  in response to detecting that a second file has been changed at said file source, performing the steps of:
    determining that a non-current version of said second file resides in said cache of files maintained within said child component; and
    in response to determining that said non-current version of said second file resides in said cache of files maintained within said child component, causing said non-current version of said second file to be updated within said child component without having received any request for said second file from said child component, by performing the steps of:
      generating a second delta of said second file wherein said second delta indicates differences between said non-current version of said second file on said child component and said second file at said file source;
      transmitting said second delta to said child component; and
      using said second delta and said non-current version on said child component to create a second updated version of said second file on said child component.

14. The computer-readable medium of claim 13, wherein said delta is compressed and the step of generating said delta further includes compressing said delta.

15. The computer-readable medium of claim 14, wherein said delta is transmitted securely and the step of transmitting said delta further includes transmitting said delta to said child component securely.

16. The computer-readable medium of claim 15, wherein said delta is transmitted securely with the HTTP SSL protocol.

17. The computer-readable medium of claim 13, wherein said request is received at a parent component and the steps of retrieving said current version and determining if said file has been modified are performed by said parent component.

18. The computer-readable medium of claim 17, wherein said parent component is on a web server.

19. The computer-readable medium of claim 17, wherein said parent component is configured to communicate with said child component and said child component is configured to communicate with said parent component.

20. The computer-readable medium of claim 13, said file is requested by selecting an item in a directory listing wherein said item corresponds to said file.

21. The computer-readable medium of claim 20, wherein a parent component generates said directory listing.

22. The computer-readable medium of claim 13, further comprising the computer-implemented step of caching said updated version on said child component.

23. The computer-readable medium of claim 13, wherein the step of retrieving said current version of said file from said file source further includes the step of checking permissions associated with said file to determine if said requestor is permitted to request said current version.

* * * * *